United States Patent [19]

Webb

[11] Patent Number: 4,492,493
[45] Date of Patent: Jan. 8, 1985

[54] PIPELINE ANCHOR HOOK

[76] Inventor: Brian C. Webb, 4236 S. 76th E. Ave., Tulsa, Okla. 74145

[21] Appl. No.: 408,665

[22] Filed: Aug. 16, 1982

[51] Int. Cl.³ .......................... F16L 1/00; E02D 5/80
[52] U.S. Cl. ...................................... 405/172; 52/157; 405/154; 405/244
[58] Field of Search ...................... 405/172, 154, 244; 52/157–162

[56] References Cited

U.S. PATENT DOCUMENTS

| 2,851,135 | 8/1954 | Woodruff, Sr. | 405/172 X |
| 2,864,633 | 12/1958 | Mackie | 52/157 X |
| 3,427,812 | 2/1969 | Hollander | 405/172 |
| 3,479,830 | 4/1967 | Ostarly | 405/172 |
| 3,568,455 | 3/1971 | McLaughlin et al. | 405/154 |
| 3,797,260 | 3/1974 | Webb | 405/172 |
| 3,841,105 | 10/1974 | Cannon | 405/172 |
| 3,903,704 | 1/1973 | Spiridonov | 405/172 |
| 4,043,139 | 8/1977 | Scott | 405/154 |
| 4,090,686 | 5/1978 | Yarbrough | 405/154 X |

OTHER PUBLICATIONS

Brian C. Webb, "The Art of Pipeline Anchoring", Pipeline & Gas Journal, Dec. 1973, pp. 48-54, Jan. 1974, pp. 42-69.

Primary Examiner—Dennis L. Taylor
Attorney, Agent, or Firm—Head, Johnson & Stevenson

[57] ABSTRACT

A ground anchor includes a saddle to receive and support buried pipe and having an anchor rod that will bend from upward forces acting on the pipe yet still retaining the pipe in the ground.

7 Claims, 8 Drawing Figures

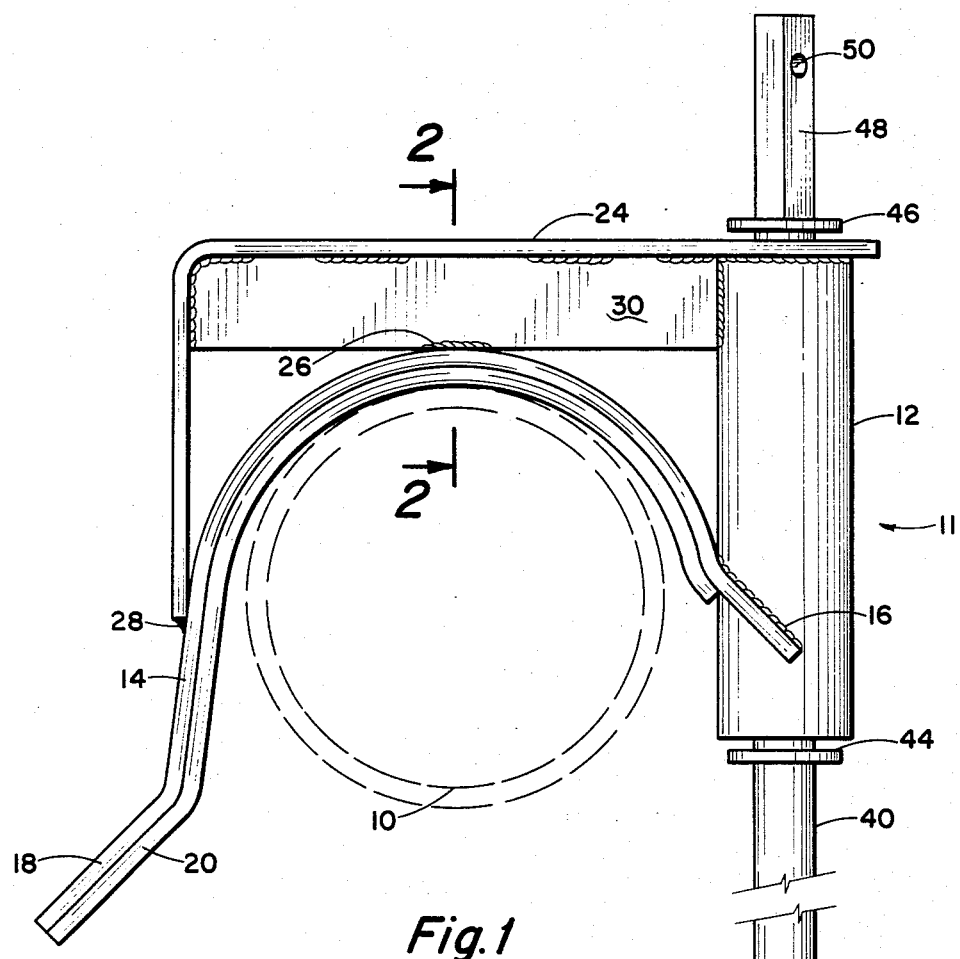
Fig.1
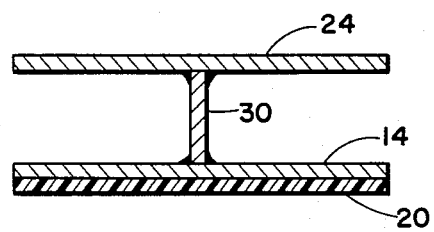
Fig.2
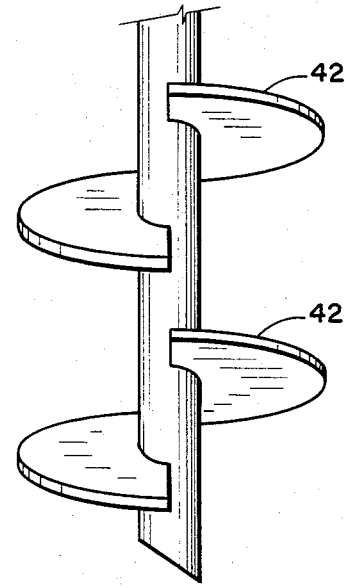

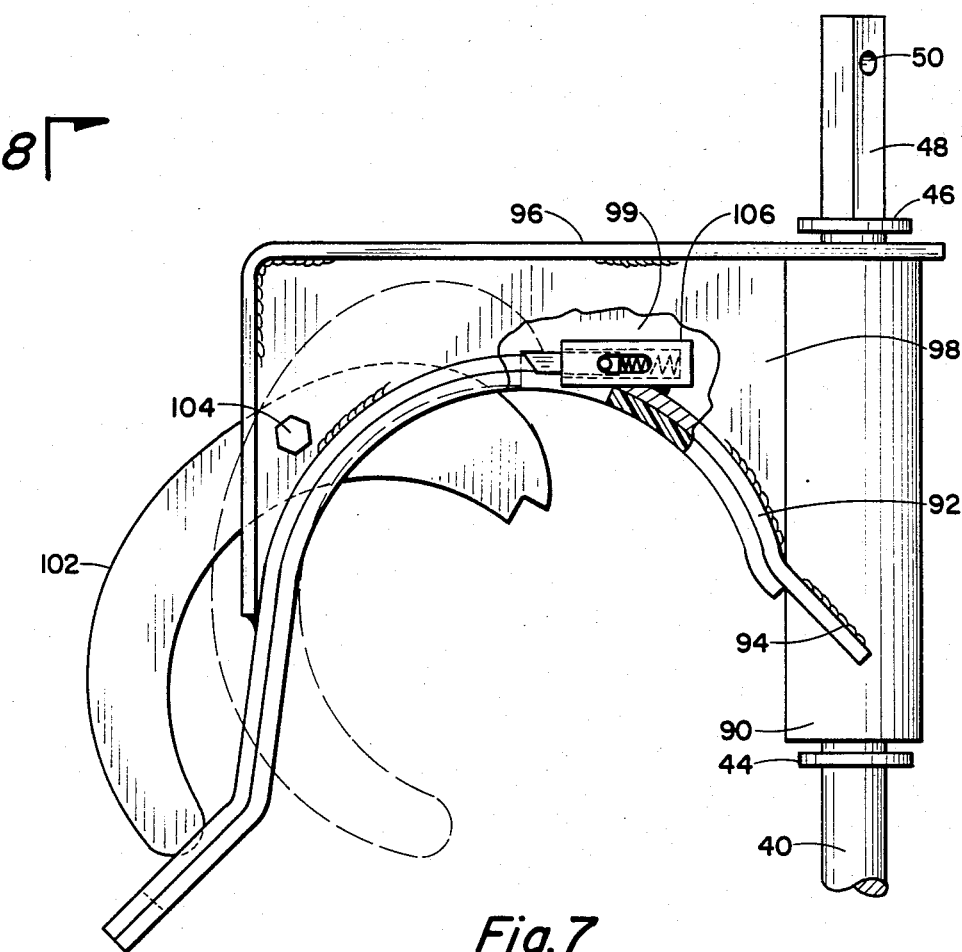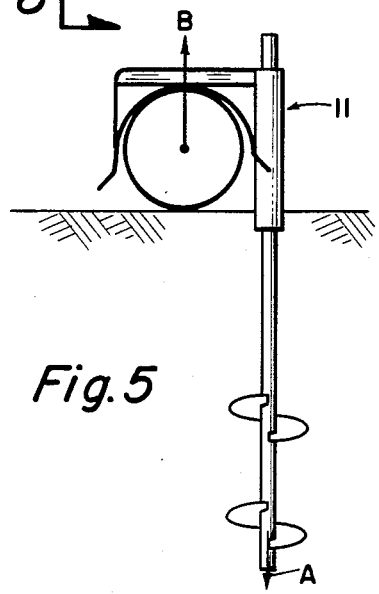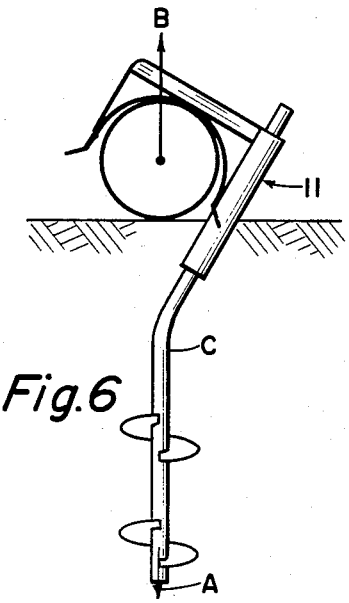

PIPELINE ANCHOR HOOK

BACKGROUND OF THE INVENTION

The invention is directed to an apparatus for anchoring or stabilizing pipelines located in lakes, rivers, swamps and perma-frost, or where varying temperature and pressure conditions of the ground require the pipeline to be made fast.

It is known to use pipeline anchoring arrangements consisting of a variety of anchors and fastening elements which are fixably secured to the anchors and then to the pipeline so that the latter is rigidly fastened and prevented from any upward or downward displacement. Various types of anchors have included reinforced concrete coatings which can be molded in place, set on, bolted on, or held by auger-type anchors into the soil. A variety of forces are at work when pipelines are laid in such areas. Expansion and contraction may take place by changes in pipeline temperature or pressure which alters pipeline length and places considerable stress upon anchoring arrangements. In addition, consideration must be given to bouyancy forces existing as the pipe will tend to be urged upwardly when totally submerged in water, depending, of course, upon the fluid being carried by the pipeline.

SUMMARY OF THE INVENTION

An object of the present invention is to provide a new and improved method and apparatus for anchoring a pipeline, especially in submerged water conditions.

It is a further object of the invention to provide a pipeline anchor which incorporates a single anchor post with at least one type of outwardly extending fluke, which is rotatably driven into the earth by a device separate from, but attachable to the rotatable anchor rod.

The invention further provides an anchor with a single rotatable anchor rod in which the anchor includes a strengthened cantilevered saddle portion capable of being easily conformed and attached to the pipe, or other object, desired to be anchored. An additional embodiment of the invention includes means for locking the attached anchor saddle to the pipe.

A further important object of the invention is to provide an anchor for a pipeline, or other object, which includes a cantilevered and strengthened saddle to encapsulate the pipe in combination with a designed bending force in the anchor rod. With any forces upward by the pipeline the pipe will stay within the saddle followed by a bending movement of the anchor rod which causes the axis of the upward forces of the pipe to approach and/or align with the axis of the anchor holddown force for greater holding.

BRIEF DESCRIPTION OF THE DRAWINGS

FIG. 1 is a side elevational view of the anchor of this invention.

FIG. 2 is a sectional view taken along the line 2—2 of FIG. 1.

FIG. 5 and 6 are schematic views of the anchor of this invention depicting the holding force principals.

FIG. 7 is a side view partly cut-away of an alternate embodiment of this invention.

DESCRIPTION OF THE PREFERRED EMBODIMENT

Figure 3:
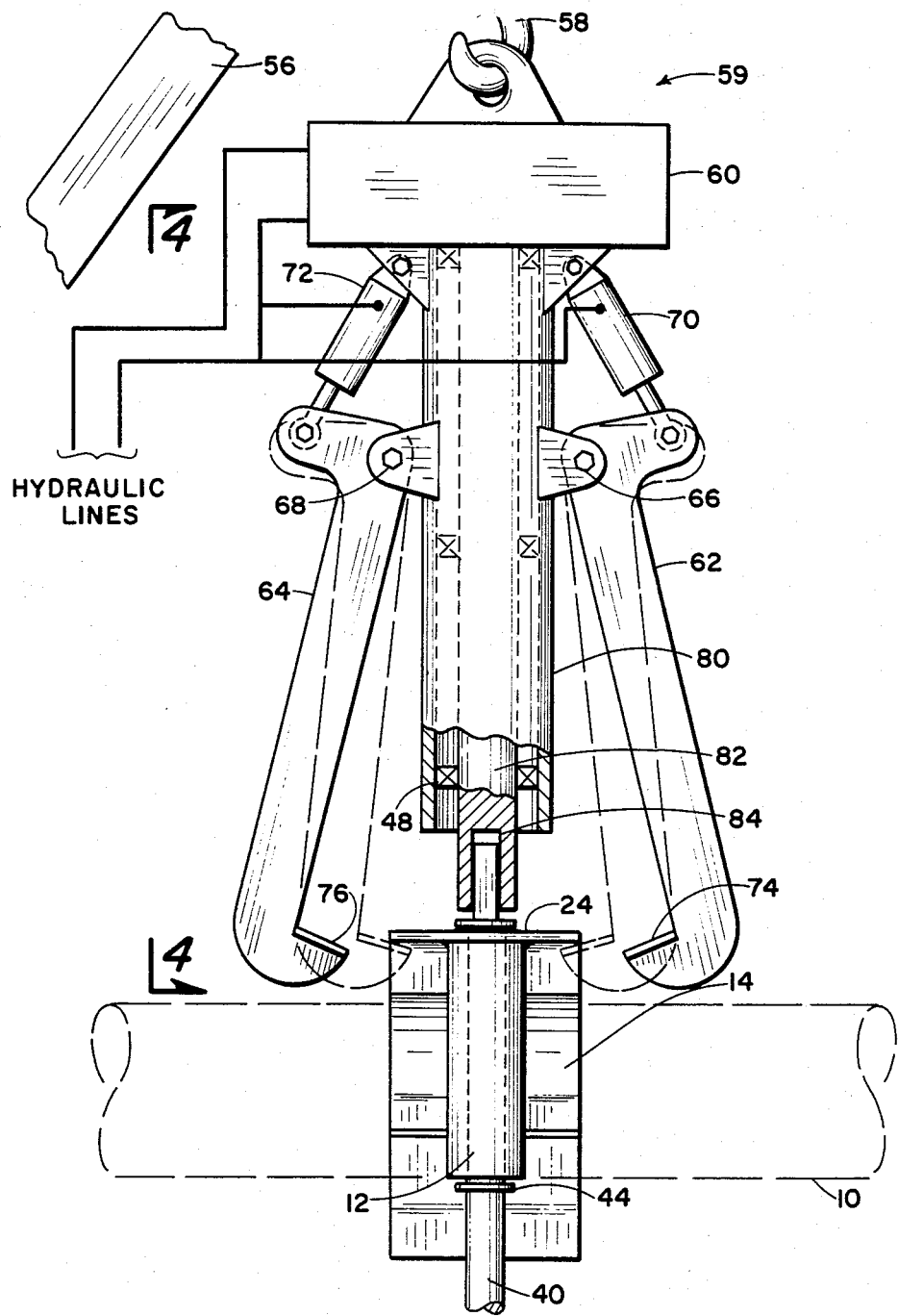
FIG. 3 is a partial view describing apparatus for urging the anchored downwardly into its holding position.

Before explaining the present invention in detail, it is to be understood that the invention is not limited in its application to the details of construction and arrangement of parts illustrated in the accompanying drawings, since the invention is capable of other embodiments and of being practiced or carried out in a variety of ways. Also, it is to be understood that the phraseology or terminology employed herein is the purpose of description and not of limitation.

Referring now to FIG. 1, the apparatus of this invention is described relative to a pipeline 10 which is to be anchored. The anchor comprises a sleeve 12 to which is welded or otherwise attached an arcuate saddle 14 at one end 16, the saddle is of a configuration to fit over the pipeline 10 or other article and includes at its other end an outwardly bent portion 18. A coating or other protective material 20 is provided on the inside of the saddle member 14 and may be of a variety of products including coatings, plastics, and the like. Supporting and strengthening the saddle is an outwardly extending flat member 24 which is bent in the manner shown and attached to saddle at weld 26 and 28. An intermediate vertical member 30 provides additional support and strengthening of saddle for the purposes herein described. Rotatably positioned within the sleeve 12 is an anchor rod 40 having a plurality of flukes 42 at the lower end thereof for rotary insertion within the ground. The anchor rod includes a lower flange 44 and an upper flange 46 for retaining the anchor rod within the sleeve 12. The upper end of the anchor rod includes a male socket member 48 having a opening 50 therein as hereinafter described.

Figure 4:
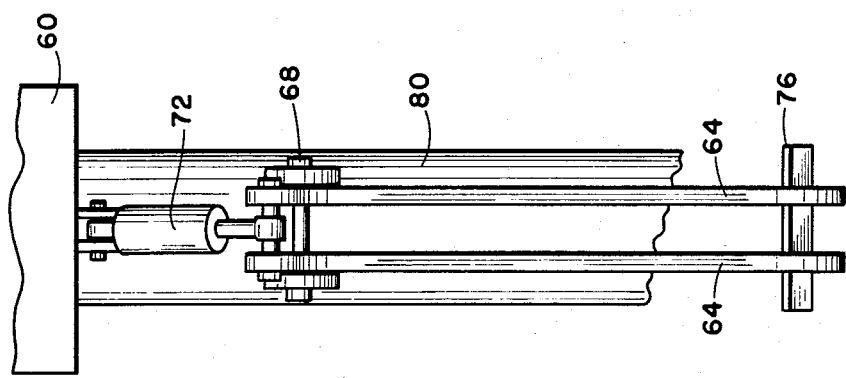
FIG. 4 is a side elevational view taken along the line 4—4 of FIG. 3.

FIGS. 3 and 4 describe a form of means to rotate and position the anchor into the ground about the pipe. A boom 56 and hoist hook 58, partially shown support a hydraulic and/or pneumatic motor 60. The hydraulic power supply system on the tractor, not shown, may be utilized to operate the motor. Below the motor are a pair of pivotal arms 62 and 64 which pivot about respective pivot pins 66 and 68. The pivotal movement being caused by hydraulic cylinder and piston devices 70 and 72. The arms 62 and 64 include the respective jaws 74 and 76 for engagement with the flat horizontal member 24, as shown by the dotted lines. The sleeve 80 supports the pivots 66 and 68 for the arms 62 and 64. Inside the sleeve 80 is a shaft 82 rotated by motor 60 and which includes a female socket member 84 at the lower end for engagement with socket 48. The shaft is suitably supported by bearings for rotational movement within the sleeve 80.

In the operation of the device described above the anchoring assembly 59 is first attached and supported to the tractor boom and hoist 56 and 58. Typically, the location of the pipeline will have been prepared and the pipeline actually laying on the ground in the position to be anchored. The anchor assembly 11 will then be attached to the operating device 59 by engagement of the female socket 84 into the male socket 48 which may be temporarily locked together by a pin through the opening 50, not shown. In most instances, the anchoring assembly 50 is utilized without a locking pin when it is desired that there be no operating personnel in the ditch with the pipeline for immediate release of the anchoring mechanism. Upon operation of the hydraulic cylinders 70 and 72, the arms 62 and 64 will be pivoted in the manner shown by the dotted lines to engagement with the bottom side of the plate 24 and there retained for raising and lowering the anchor and to keep the sockets engaged. The anchor rod 40 is then positioned so that the saddle 14 will receive pipe 10. Rotational movement of the rod is caused by the motor 60 and will cause the anchor rod and its associated flukes to drive into the ground. Once it would appear that the anchor is in place, the anchor holding force may be tested by raising the assembly 59, and/or using a force measuring means such as described in U.S. Pat. No. 3,797,260 issued Mar. 19, 1974. If the anchor holds for the predetermined amount of force designed, the arms 62 and 64 are released and the anchoring assembly 59 pulled from its engagement with the anchor for use at the next anchoring system.

Figure 8:
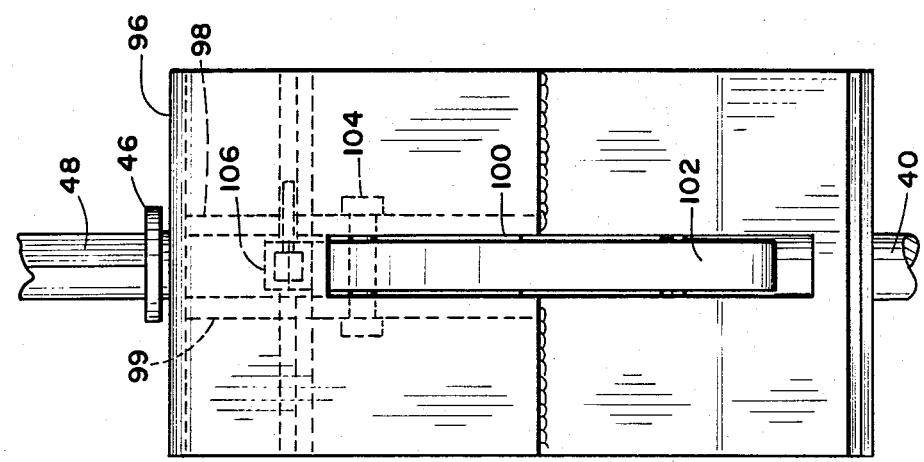
FIG. 8 is a view taken along the line 8—8 of FIG. 7.

A modified form of the invention is described in FIGS. 7 and 8. In this embodiment, a sleeve 90 includes therewith rotatable anchor rod 40 as previously described being retained by flanges 44 and 46. Extending outwardly from the sleeve 90 is the arcuate saddle 92 which is attached at one end 94 to the sleeve 90 and of design substantially similar to that shown in FIGS. 1 and 2. To support the saddle a horizontal member 96 is suitably welded to the saddle and is further supported by a pair of spaced vertical members 98 and 99. A cut-out portion 100 is adapted to receive a pipeline cradle 102 which is pivoted at 104 from an outward position to a latched position as shown by the dotted line in FIG. 7. An appropriate spring biased latch 106 is provided to retain the cradle 102 about the pipe as a safety measure.

FIGS. 5 and 6 are schematic descriptions of the theory of operation of this invention when the buoyancy forces become excessive. Note that in FIG. 5 the buoyancy force of the pipes shown by the arrow B is off-set or not in alignment with the hold down force shown by the arrow A. The anchor of the invention is so designed that upon increasing buoyancy forces the pipe will not leave the anchor 11 but instead the anchor rod is allowed to bend at C as shown in FIG. 6, whereby the buoyancy force increases the pipe has a tendency to align the buoyancy force B with the anchoring force A, and thus, minimizing the leverage force that was created by the off-set.

What is claimed is:

1. A ground held anchor to restrain upward movement of buried or submerged pipeline or other articles comprising:
    a sleeve;
    an arcuate saddle one end of which is attached to said sleeve and extending outward thereof, said saddle of interior configuration to fit over said pipeline or article;
    a saddle structural support means attached to said sleeve and extending outwardly therefrom, said support means attached to the exterior of said saddle to prevent bending of said saddle from said upward movement of said pipeline.
    an anchor rod rotatably supported within said sleeve, said rod having at least one ground engaging fluke, said rod being bendable, before disengagement of said anchor rod and fluke, from the ground, at a point along its length just below said sleeve due to said upward movement.

2. The anchor of claim 1 wherein said saddle support is defined by an outwardly extending flat vertical member attached to said sleeve and to the top periphery of said saddle and a flat horizontal member attached to said sleeve, to the top of said vertical member, and to the outer periphery of said saddle.

3. The anchor of claims 1 or 2 including a protective non-metallic coating on the inner periphery of said saddle adjacent said article.

4. The anchor of claims 1, or 2 wherein the outer tip of said saddle is bent outwardly of said configuration.

5. The anchor of claims 1, or 2 wherein said anchor rod includes means to attach said anchor rod with an external rotating means.

6. The anchor of claim 5 wherein said rotating means includes releasable means attachable to said saddle support to hold said anchor while rotating said anchor rod.

7. The anchor of claim 1 including a cradle pivotally attached to said saddle or saddle support means to retain said pipeline or other article within said saddle and a releasable latch to retain said cradle from pivotal movement when said pipeline or other article is retained within said saddle.

* * * * *